ved July 8, 1969

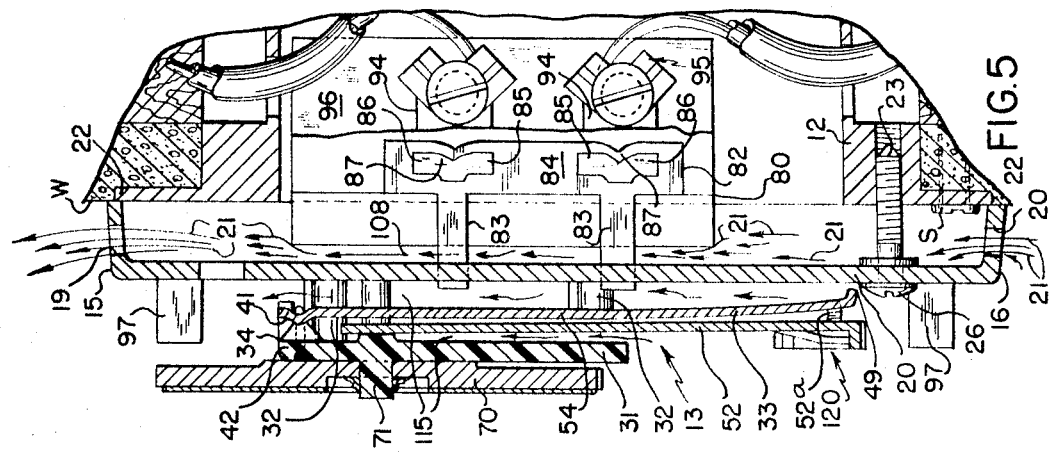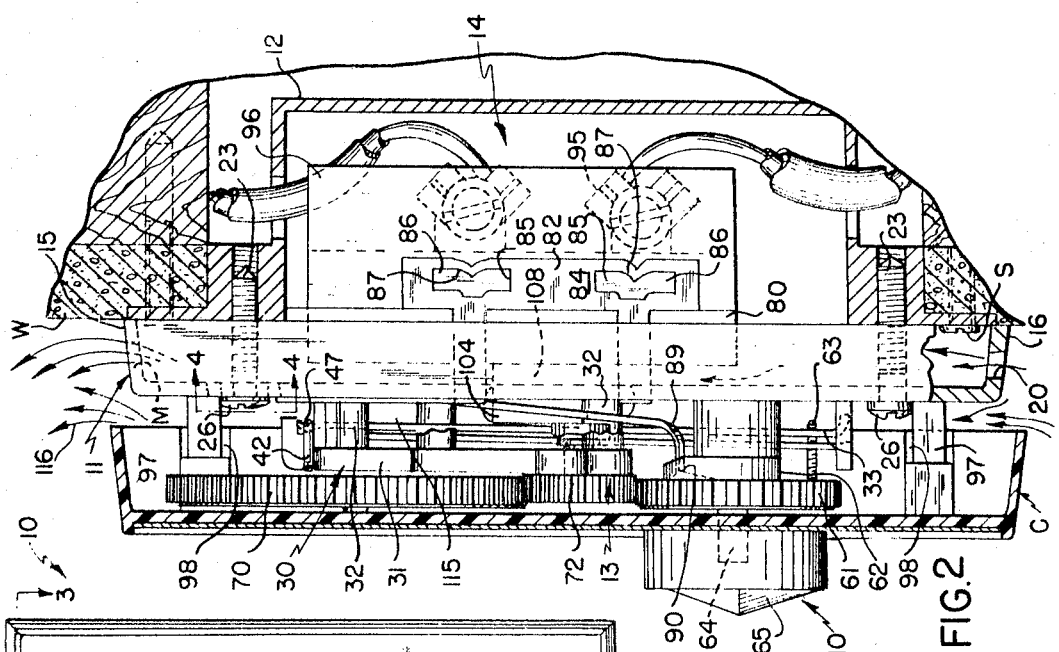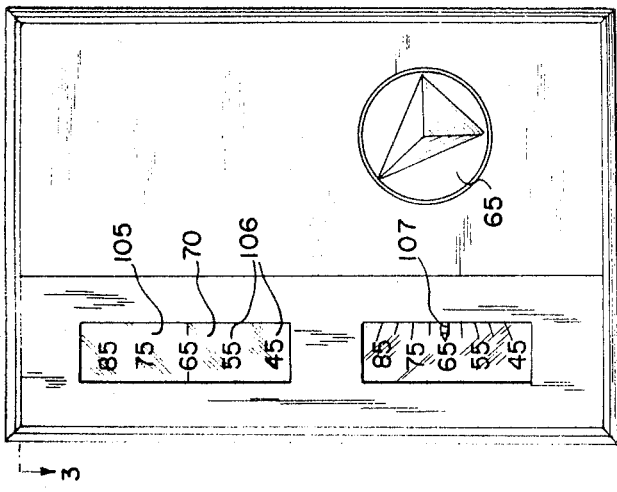

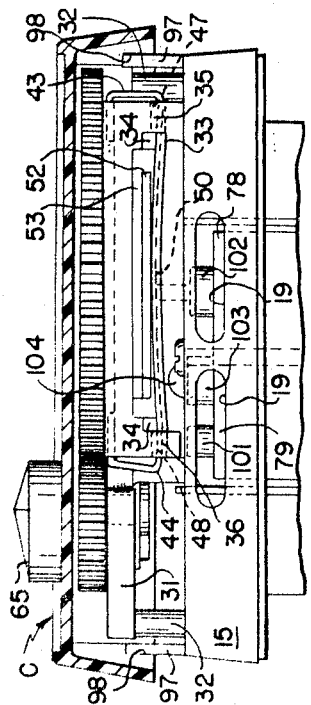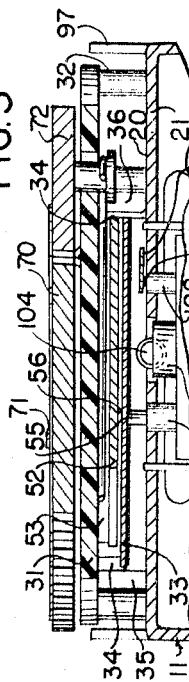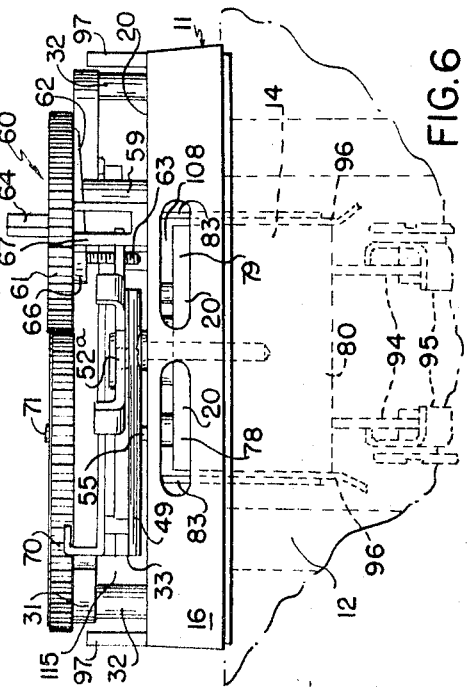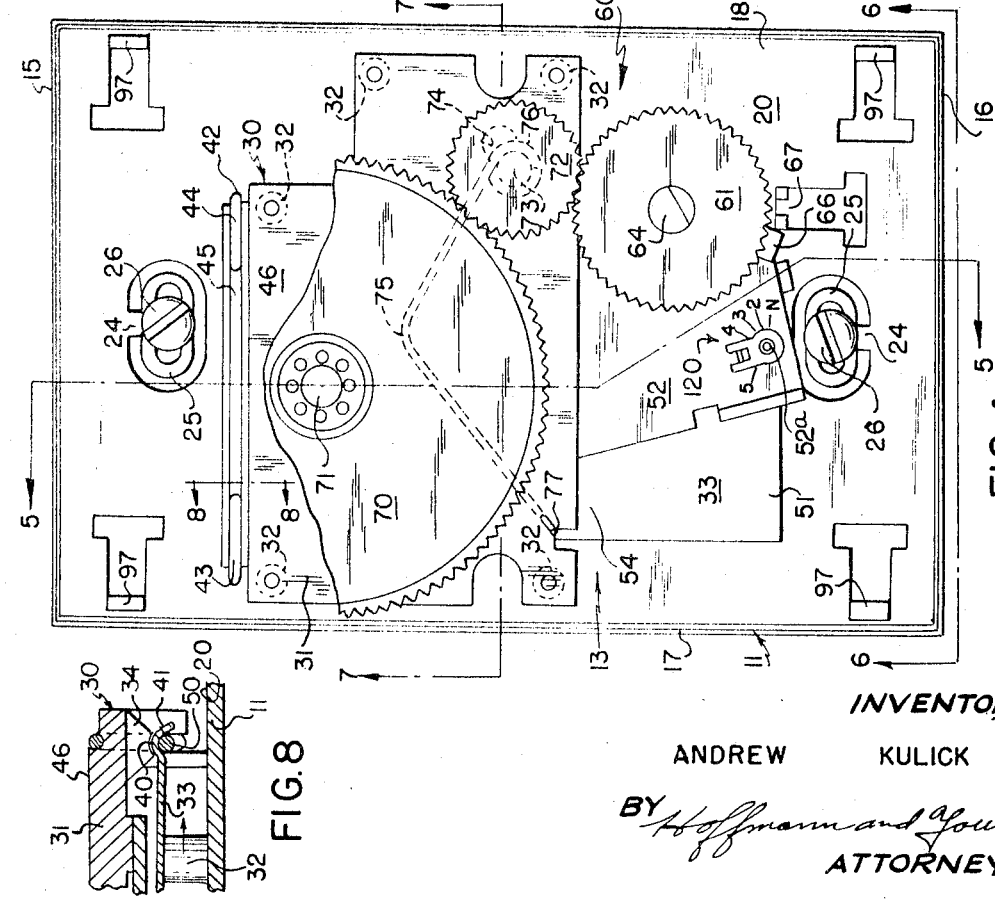

3,454,919
ROOM THERMOSTAT FOR CONTROLLING ELECTRICALLY OPERATED ROOM HEATING MEANS
Andrew Kulick, Columbus, Ohio, assignor to Ranco Incorporated, Columbus, Ohio, a corporation of Ohio
Filed Sept. 12, 1966, Ser. No. 578,598
Int. Cl. H01h *37/52, 37/14, 71/22*
U.S. Cl. 337—360                                    13 Claims

ABSTRACT OF THE DISCLOSURE

A thermostatic switch adapted to be mounted on a wall to control a room heater includes a bimetal sheet supported on a structure forming air flow paths which dissipates heat generated by current passing through the switch so that false operation of the switch by the bimetal is obviated. The central portion of the bimetal is connected to the switch and one end of the bimetal is adjustably positioned to change the temperature at which the switch is operated. An anticipator heater is located on the bimetal support and closely spaced to the portion of the bimetal which actuates the switch.

---

The present invention relates to a thermostat and more particularly relates to a thermostat for controlling operation of apparatus for temperature conditioning the air in a room or air space to maintain a predetermined air temperature.

In prior art thermostats, a thermostatic element has been utilized to control air temperature in a room or air space to be conditioned by actuating a relay switch which in turn controls the power circuit of electrically energized air tempering apparatus. However, it is advantageous to provide a thermostat wherein the thermostatic element directly actuates the power circuit control switch for the air tempering apparatus. Thermostatic controls of the latter type have been unsatisfactory because the relatively large amounts of electrical power carried by the switch means generates heat which affects the thermostatic element and causes cycling of the air tempering apparatus at a room temperature below that for which the thermostat is set to operate. Moreover, the degree of inaccuracy of operation of such thermostats, because of the condition first described, increases directly with the demand for either heating or cooling and a temperature "droop" in the air of the room or space being tempered results. The problem of temperature "droop" has been particularly troublesome in installations utilizing electric resistance baseboard-type heaters, where the temperature "droop" in the room or air space may be as high as 22 F. degrees.

Accordingly, a principal object of the present invention is the provision of a new and improved room thermostat of the type mentioned wherein the thermostatic element of the thermostat is isolated from heat generated by the switch operated thereby so that the temperature sensitive element is closely responsive to the temperature of air in the room or air space and temperature "droop" is substantially eliminated.

Another object of the present invention is the provision of a new and improved thermostat having a base or frame for supporting a switch adapted to carry electrical power to a room conditioning apparatus and wherein the switch is spaced from the thermostatic element carried by the base, the base including means forming a vertically extending air passageway between the switch and element so that resistance heat produced in the switch during operation of the room conditioning apparatus is carried away by air currents developed in the passageway.

Another object of the invention is the provision of a new and improved thermostat device as set forth in the next preceding paragraph wherein an air passageway means is provided by which the heat from the switch induces a flow of room air across the thermostatic element and passing between the switch and the element so as to further isolate the thermostatic element from influence of heat from the switch.

Another object of the present invention is the provision of a new and improved thermostat having a base member, a switch, a thermostatic means for operating the switch and which is adapted to be connected to a part of a wall of a room or air space to be conditioned and wherein the base member is adapted to be secured to the wall by threaded connectors supported on the base member by a deformable or flexible arm so that tightening of the connectors effects deformation of the arm of the mounting elements without imposing undue warping or twisting forces on the base member which might otherwise adversely affect the spacial relationship of the thermostatic element and switch.

A still further object of the present invention is the provision of a new and improved thermostat including a base, switch means supported on the base, bimetallic thermostatic element operable to actuate the switch means in response to air temperature and an anticipator resistor positioned for heating the thermostatic element, and in which the thermostatic element is fixed at one of its ends with its other end adjustably movable to change the air temperature at which the switch is actuated with the anticipator resistor positioned so that the amount of heat provided thereby to the thermostatic element remains substantially constant regardless of adjusting movement of the thermostatic element.

Other objects and advantages of the present invention will become apparent from a consideration of the detailed description thereof which follows as well as from the drawings which form a part of the specification and in which:

FIG. 1 is a front elevational view of a thermostat embodying the present invention;

FIG. 2 is a side elevational view of the thermostat of FIG. 1 on a larger scale and attached to a portion of the wall of a room, certain parts being shown in section;

FIG. 3 is a sectional view of the thermostat of FIG. 1 taken approximately at line 3—3 and on a larger scale;

FIG. 4 is a front elevational view of the thermostat of FIG. 1 having parts removed and shown in a larger scale;

FIG. 5 is a sectional view of the thermostat of FIG. 4 taken approximately at line 5—5;

FIG. 6 is a sectional view taken approximately along line 6—6 of FIG. 4;

FIG. 7 is a sectional view taken approximately at the line 7—7 of FIG. 4; and

FIG. 8 is a fragmentary sectional view of a portion of the thermostat shown in FIG. 2 and on a larger scale.

Referring to the drawings, a thermostat 10 embodying the present invention is shown for controlling the air temperature in a room of a building, or the like, which is heated by electric resistance baseboard-type heaters, the circuits of which are controlled by the thermostat. The room and heaters are not shown as they are not essential to the disclosure of the invention. It will be apparent from the following description that thermostats embodying the present invention are useful for controlling other types of equipment for maintaining a room or air space at predetermined temperatures.

The thermostat 10 includes a base member 11 which is mounted on a junction box 12 located in a recess in an interior wall W of the building. The thermostat 10 includes a temperature responsive power means 13 supported on the base 11 and spaced from the plane of the wall into the room and which actuates a switch means 14 supported on the opposite side of the base member and projecting into the junction box 12. The base 11 removably supports a suitable cover member C which overlies the temperature responsive means 13.

The base member 11, which is preferably formed of sheet metal, is generally rectangular and includes rearwardly extending end flanges 15, 16 and side flanges 17, 18. The end flanges 15, 16 have slot-like openings 19, 20 therein respectively and the end and side flanges are suitably joined at the corners of the base member to provide a rigid panel-like structure adapted to be supported in spaced, parallel relation with the wall. The rearwardly extending side flanges substantially abut the wall W, and provide a vertically extending stack structure through which air from the room may pass upwardly, entering the openings 20 and exiting through the openings 19 as is indicated by the arrows 21.

The junction box 12 is of conventional construction and includes a box-like portion extending into an opening in the wall and vertically extending tab portions 22 at upper and lower ends thereof which have openings for the reception of screws S by which the junction box is secured to the wall, as is common practice. The tab portions 22 of the junction box 12 are provided with tapped holes 23 to receive screws 26 by which the base member 11 is attached to the junction box.

The base 11 is attached to the junction box 12 by mounting means which comprises two arms 24 formed by cutting C-shaped portions from the central section of the base member 11 adjacent opposite ends thereof and each of which arms has an eye portion 25. The eyes 25 each receive a screw 26 threaded into the tapped openings 23 in the junction box 12. The eyes 25 are elongated and loosely receive the screws 26 to permit adjustment of the position of the base relative to the wall. The dimensions of the arms 24 are such that should the eyes 25 thereof be subjected to deflection or twisting stresses when firmly screwed to the junction box 12, the arms 24 deflect and twisting or warping stresses will not be imparted to the base member 11 which will warp that member. In the event of excessive tightening of the screws 26 during installation of the thermostat which draws the edges of the flanges 15, 16 of the base member 11 snugly against the wall W, which might occur for example, if the wall is uneven, one or both of the arms 24 deforms without transmitting distortional forces to the generally planar configuration of the base member which might otherwise occur and cause misalignment of parts of the temperature controlling means resulting in inaccuracies or failure in the operation of the thermostat. Thus, special skill or care in the installation of the base member 11 to the junction box is not required.

The temperature responsive power means 13 is supported on a mounting bracket 30 projecting from the forward face 27 of the base member 11. The mounting bracket 30 is preferably formed of a material having a high resistance to thermal conductivity, such as a molded plastic, and includes a plate member 31 which is spaced from the base member 11 by a plurality of legs 32 which are connected to the base member by suitable means such as rivets, which have not been shown.

The mounting bracket 30 supports a generally rectangular sheet-like bimetallic thermostatic element 33 which is pivotally supported at one end to the bracket 30 and extends generally parallel to the face 20 of the base 11 and the plate member 31. As shown in FIGS. 3, 7, 8 of the drawings, the mounting bracket 30 includes two bearing lugs 34 formed thereon at opposite sides which extend rearwardly relative to the support plate 31 and each lug has an inner arcuate concave bearing surface 37 which receives the convex outer wall 40 of a trough-like corrugation 41 formed across the thermostatic element 33 to provide a pivotal support for the element. The thermostatic element 33 is retained against the surfaces 37 by a wire spring 42 extending into the corrugation 41 and having the end portions 43, 44 thereof extending through slots 45, 46 in the lugs 34 and being bent to be received in a groove 47 formed across the outer face of the plate 31. The central portion 50 of the spring is bowed and seats in the corrugation 41 of the element 33 to urge the element into engagement with the bearing surfaces 37.

The lower end 56 of the bimetallic element 33 is urged forwardly relative to the base 11 and against a screw 52a in the lower end of an adjusting arm or plate 52 by a two piece switch operating plunger or pin 55 engaging the central portion thereof, as is described hereinafter. The lower end of the thermostatic element 33 follows movement of the screw 52a as the arm 52 is moved toward and from the base member 11 in the manner described hereinafter. The lower end 51 of the thermostatic element is provided with a rearwardly extending flange portion 49 which engages the base member 11 and prevents distortional movement of the thermostatic element should it be inadvertently pressed inwardly during handling of the thermostat. Thus, the accuracy of the thermostat is not apt to be impaired during handling thereof.

The adjusting arm 52 comprises a stiffly resilient metal plate which is positioned between the mounting bracket 30 and the thermostatic element 33 wtih the upper end thereof rigidly attached to the bracket 30 by riveting to a boss 53 projecting rearwardly from the plate member 31 so that the adjusting arm is supported in cantilever fashion between the plate of the bracket and the base member 11.

The thermostatic element 33 is maintained in a slightly forwardly bowed condition best shown in FIG. 6, and as the temperature of the element increases and decreases, the central portion thereof moves rearwardly and forwardly, respectively, relative to the base 11 and actuates the switch means 14 as is described more fully hereinafter.

The central portion of the element 33 is engaged by the switch operating plunger 55 which projects from the switch means 14 and extends through an aperture in the base 11. The plunger 55 has a necked end 56 which projects through an opening in the element 33 so that the element presses against the shoulder about the neck to urge the plunger toward the switch mechanism. The plunger 55 is constantly urged outwardly against the bimetal element 33 but moves forwardly and readwardly relative to the switch means 14 in response to changes in bowing of the element and is effective to actuate the switch means between "on" and "off" conditions in response to such movement.

The bimetallic thermostatic element 33 may be adjustably positioned toward or away from the switch means 14 to vary the temperatures at which the element actuates the switch means by an adjusting mechanism 60 supported on the bracket 30 and which is effective to move the lower end of the adjusting arm 52 toward and away from the base 11 and thereby change the degree of bowing of the bimetallic element required to effect opening and closing of the switch means 14.

The mechanism 60 includes a gear wheel 61 which is rotatable to effect movement of the adjusting arm 52. The gear wheel 61 is composed of a material having a high resistance to heat conduction, such as a phenolic plastic, and is rotatably connected to the base 11 by a suitable bearing means 59 supported on the base 11. The gear wheel 61 includes a cam surface 62 forming a generally helical cam ramp on the rearwardly facing side thereof and which cooperates with a follower screw 63 threaded through the adjusting arm 52 with its forwardly extending end engaged with the cam surface 62. The threaded connection between the follower screw 63 and the adjusting arm 52 permits factory calibration of the thermostat. The gear wheel 61 also includes a forwardly extending stub shaft 64 which is formed integrally therewith and is constructed to receive a suitable knob 65 which is fixed to the shaft 64 by which the gear wheel may be rotated. Rotation of the gear wheel 61 moves the cam surface 62 relative to the follower screw 63 of the adjusting arm 52 so that adjusting movement of the thermostatic element 33 relative to the switch means 14 is effected. The gear wheel 61 includes a projection 66 which extends radially outwardly from the outer periphery thereof and which engages a stop 67 formed on the base member 11 to limit rotation of the gear wheel 61.

Rotation of the gear wheel 61 also rotates a gear wheel 70 which is journaled on a pin 71 on the mounting bracket 30 and the outer face of which bears suitable indicia which cooperates with other indicia, described hereinafter, for indicating temperatures at which the thermostat is set to operate the switch means. The gear wheel 70 is suitably held on the pin 71 by a locking washer which is pressed over the end of the pin.

The gear wheel 70 is driven by the gear wheel 61 through an idler gear 72 interposed between the respective gears and which has a shaft 73 extending through an elongate hole 74 in the mounting bracket 30 so that the idler gear 72 may move laterally out of mesh with the gears 61 and 70 to permit relative rotation between the gear wheels 61, 70 for calibration of the temperature indicia. The idler gear 72 is biased into mesh with the gears 61 and 70 by a wire spring 75 having one end 76 encircling the shaft 73 of the idler gear 72 and a second end 77 fixed to the mounting bracket 30 so that the end 76 constantly biases the idler gear 72 into mesh with the gear wheels 61, 70. When the gear wheel 70 is rotated manually counterclockwise, the idler gear 72 is moved laterally thereby and out of mesh with the gear wheel 61 so that the gear wheel 70 can be positioned as desired independently of the knob 65 for calibrating the thermostat.

The switch means 14 includes a pair of switches 78, 79 connected in series circuit and which may be of any suitable conventional construction and therefore have not been illustrated in detail. The switches are housed in a case 80 formed of a material having a high resistance to thermal and electrical conduction, which is fixed to the base member 11 by a pair of metallic brackets 82. The brackets 82 extend rearwardly of the base member and each includes legs 83 which are staked in apertures in the base member 11, and an integral cross-piece 84 connecting the rearward ends of the legs 83. The cross-piece 84 includes apertures 85 therein which receive bosses 86 formed on opposite sides of the case 80. The bosses 86 have concave sides against which a wall 87 of the aperture is pressed by deformation thereof to securely clamp the bosses in the apertures. The switch 78 is a snap-acting switch and is actuated by axial movement of the plunger 55 and the terminals of this switch are connected in a series circuit with the heater elements for heating the room air and the full current load of the heaters pan through this switch.

The other switch 79 is a normally closed switch having an operating plunger 88 which projects through an opening through the base 11 and is biased outwardly against a spring strip 89. The strip 89 is riveted at its upper end to the base 11 and has an outwardly turned lower end which rides on a cam surface 90 formed on the rear face of the gear wheel 61. The cam 90 is arranged to depress the strip 89 toward the base 11 and open the switch actuated by the plunger 87. The switch means 14 can be manually opened to render the thermostatic control inoperative by turning the gear wheel 61 counterclockwise to its limit of travel thereby depressing the strip 89 to move the plunger 88 rearwardly relative to the base 11 and open the switch means 14 so that the thermostat and heating elements are in a positive "off" condition.

The switch means 14 is connected in circuit between a source of electric power, such as 220-volt alternating current power provided for domestic use and the room heating elements, not shown, by suitable conductors. The switches 78, 79 are provided with four conventional blade-type terminals 94 which extend through openings in a rear side of the case 80 for effecting a connection between the switch and the conductors. Preferably, each of the terminals 94 includes a suitable wire securing device 95. The terminals 94 are shielded from the walls of the junction box by sheets 96 of insulating material held between the brackets 84 and the case 80.

The forward side of the case 80 includes a pair of sleeves 101 and 102 which are formed of the thermally nonconducting material of the case and which form bushings for the plungers 55 and 88, respectively. The sleeves are snugly received in suitable apertures in the base member 11. The forward side of the case 80 additionally includes a support portion 103 which is formed of the material of the casing and which extends through an elongated aperture in the base member 11. An anticipator in the form of a cylindrical electric resistor 104 is nested in the support portion on the forward side of the base member 11 and is positioned adacent the thermostatic element 33 and near the point at which the switch plunger 55 engages the element. The anticipator resistor 104 is connected in a parallel circuit with the snap switch 78, which is operated by the thermostatic element 33, and is operative to slightly heat the element to anticipate temperature changes of the room air resulting from energization of the room air heaters in a manner which is well known. The anticipator resistor 104 is positioned adjacent the central bowed portion of the element 33 so that the element 33 is heated adjacent the portion which engages the switch operating plunger 55. By this arragnement, regardless of the extent of shifting of the bimetal element 33 by the adjusting cam 62, the spacing of the bimetal element form the anticipator resistor 104 is substantially unchanged and the element is heated thereby at a substantially constant rate regardless of changes in the temperature adjustment.

The cover member C is preferably formed of molded plastic and includes a generally rectangular planar face plate and flange portions extending rearwardly about the edges thereof. The cover C is frictionally held to the base member 11 by four forwardly extending legs or projections 97, which are formed by outwardly struck portions of the base member. The outer sides of the projections are embraced by shoulders 98 which are formed on the inner sides of the cover member adjacent the corners thereof and which provide frictional connections between the cover member and the projections. As illustrated in the drawings, the projections 97 are of such length that the outer edges of the rearwardly extending flange portions of the cover member C are spaced from the base 11 to provide air flow passages between the base and cover and about the thermostatic element 33.

The cover C has a window 105 through which a portion of the face of wheel 70 is visible and the indicia on the wheel cooperates with indicia 106 on the cover window to indicate the temperature setting of the thermostat. Preferably, a temperature indicator 107 is provided on the cover, and because such indicators are well known, it is not described or shown in detail.

The shaft 64 of the adjusting gear 61 extends through an opening in the cover and the knob 65 is supported on the shaft on the outer side of the cover so as to be readily accessible.

In accordance with the present invention, the thermostat 10 is constructed so that heat created by electric current passing through the switch means 14 is carried away therefrom with a minimum of heat transfer to the thermostatic element 33. As shown in FIG. 5, the brackets 82 connecting the case 80 of the switch means 14 to the base member 11 are of such length that the forward side of the case is positioned forwardly of the plane of the rear edges of the end and side flanges 15, 16 and 17, 18, respectively, of the base member, so that the case extends slightly from the junction box 12 into the room in which the thermostat is installed. The spacing between the forward side of the case 80 and the rearward major surface of the frame member 11 is such that an air passageway 108 is formed between the case of the switch means 14 and the base member. When the baseboard air heating elements are energized, the switches 78, 79 are carrying current thereto, the switch means is heated, as previously described and a convective flow of air is created in the passageway 108 between the case 80 and the base member 11. As mentioned previously, the base member 11 and the wall W cooperate to form a stack through which air passes upwardly by reason of the heat generated in the switches. Thus heat is carried away from the switch means 14 by a curtain of air flowing between the switch case 80 and the panel portion of the base member 11 so that the element 33 is not subjected to an appreciable degree by the heat from the switches.

Since the mounting brackets 82 are connected to the case 80 by the non-conductive projections formed on the case, heat transfer by conduction between the case and the base member 11 is substantially minimized. Additionally, the sleeves 101 and 102 which surround the operating plungers 55 and 88, and the support 103 for the anticipator resistor 104 are formed of a thermally non-conductive material, as noted, so that heat transfer by conduction between the sleeves and support and the base member is minimized.

The plate 31 of the mounting bracket 30 is spaced substantially from and parallel to the base member 11 by the legs 32 to provide an air passage 115 therebewteen. The cover member C, is supported by the projections 97 on the base member 11 spaced from the forward side of the base member and provides a free passage for room air through the air passage 115 and across the element 33. When the switch means 14 is heated as a result of operation of the heating elements in the room, air flows upwardly through the openings 19 in the flange 15 at a relatively high velocity and entrains air adjacent the upper side of the thermostat cover C to induce a flow of room air upwardly through the passageway formed between the mounting bracket 30 and the base 11, as shown by the arrows 116 in FIG. 2. The air flow induced in the passageway 115 is approximately at room temperature and therefore the air surrounding the thermostatic element 33 closely represents the temperature of the air in the room. It is apparent that the induced flow of room temperature air across the element 33 provides a more accurate response to the temperature of the room air rather than would the temperature of a body of stagnant air surrounding the element 33. Moreover, the flow of room temperature air through the passageway 115 is effective to carry away any heat which may be transferred from the switch means 14 to the theromstatic element through the base 11. The low heat conductivity of the connections between the elements of the thermostat further minimize the heat transfer between these parts.

It should be appreciated that heating of the switch means 14 is directly related to the size, or power requirements of the heating elements in the room. Thus heating elements for a large room require more power than would be required to maintain a smaller room at the same temperature, so that heating a large room causes more heat to be generated by the switch means 14. Since a certain amount of heat transfer between the switch means 14 and base member 11 is inevitable, means 120 is provided for compensating for the amount of heat produced by the switch means 14 in relation to the requirements of the heating elements and the size of the room to be heated. As best shown in FIGS. 4 and 6, the compensating means 120 is the coarse threaded screw 52a which forms the contact between the adjusting arm 52 and the thermostatic element 33. The screw 52a is threaded into an aperture in the adjusting arm adjacent its free end and adjacent the free end of the element 33. The outwardly facing surface of the adjusting arm 52 is preferably provided wtih indicia indicating the power requirements of the heating elements to be associated with the thermostat so that the compensating screw 52a may be properly advanced to provide requisite positioning of the thermostatic element 33 relative to the adjusting arm in accordance with the rating of the room heating elements. As illustrated in the drawings, the indicia corresponds to the kilowatt rating of the heating elements, however, any suitable indicia can be associated with the screw 52a.

It can now be seen that an improved thermostat has been provided which is effective to substantially reduce temperature "droop," or shifting of a control point of the thermostat, in response to operation of a room heating or cooling apparatus and that the reduction of "droop" has been effected by a novel construction wherein heat transfer between the switch and the temperature responsive means of the thermostat is substantially minimized. It should further be apparent that a new and improved mounting construction for the thermostat has been provided which is effective to prevent distortion of the base of the thermostat when installed on a wall or the like so that accuracy of the thermostat is not impaired by improper installation.

Although a preferred embodiment of the present invention has been illustrated and described herein in considerable detail, the present invention is not to be considered to be limited to the precise construction disclosed herein. It is my intention to cover hereby all modification, adaptations and uses of the present invention which come within the scope of the appended claims.

Having described my invention, I claim:

1. In a thermostat for controlling air temperature in a room comprising, a base member adapted to be connected to a wall of the room and comprising a vertically extending panel portion supported in spaced relation relative to the wall, temperature responsive means supported on said panel portion and including a thermostatic element spaced from one side of said panel and movable in response to temperature changes, switch means operable by movement of said thermostatic element, connecting means between said switch means and said base member for supporting said switch means in spaced relation with said panel portion and on the side opposite said one side, said switch means and said panel including surfaces providing spaced confronting walls of an air passageway therebetween, said surface of said switch means being heated when said switch means conducts to effect a flow of air through said passageway effective to transfer heat from said switch means and decrease the amount of heat transferred from said switch means to said temperature responsive means through said base member.

2. In a thermostat as defined in claim 1 wherein said base member includes flange portions extending toward said wall and forming vertical side walls of an air passage for directing air upwardly between said surfaces of said panel and said switch means.

3. A thermostat as defined in claim 1 and wherein said thermostatic element is a generally rectangular bimetallic sheet disposed in a plane generally parallel to and spaced from said panel of said base member to form a second air passageway which is between said sheet and said panel and means for inducing a flow of air from said room through said second air passageway, said thermostatic element moving to actuate said switch means in response to changes in temperature of said air flowing in said second passageway.

4. In a thermostat as defined in claim 2 and wherein said swtich means is positioned in a cavity in said wall and includes a portion projecting from said cavity toward said panel of said base member and with said surface of said switch means formed on said projecting portion.

5. A thermostat as defined in claim 2 and wherein said thermostatic element is a generally rectangular bimetallic sheet disposed in a plane generally parallel to and spaced from said panel to form a second air passageway between said sheet and said panel, and means for inducing a flow of air from said room through said second air passageway, said thermostatic element moving to actuate said switch means in response to changes in temperature of said air flowing in said second passageway.

6. A thermostat as defined by claim 5 wherein said bimetallic sheet is cantilevered having one end fixed relative to said base and its other end adjustably movable and further including anticipator heating means positioned adjacent a central portion of said sheet with the spacing between said heating means and said central portion of said sheet being substantially constant for all adjusted positions of said other end.

7. A thermostat as defined by claim 5 and further including a plate-like cover member supported by said base member and lying in a plane parallel to and spaced from said bimetallic sheet and said panel, said cover member having side flanges projecting toward the plane of said panel and forming vertical sides of an air passageway through which air passes from said room and over said sheet.

8. A thermostat as defined in claim 7, wherein said flange portions extend between said panel of said base member and said wall, and further including a flange across the upper end of said base member, and wherein said means for inducing said flow of air in said second passageway includes an opening in said flange for discharging air from said first passageway adjacent the upper end of said cover for creating a low pressure region adjacent said upper end of said base member to induce a flow of room air through said opening between said cover member and said base panel.

9. A thermostat for controlling temperature of air in a room comprising a base member adapted to be connected to a wall of the room, temperature responsive means connected to said base member and including a thermostatic element movable in response to temperature changes, switch means operable to conduct electrical power to an apparatus for changing the air temperature in the room in response to movement of said thermostatic element, support means for positioning said thermostatic element in spaced relation to said base member, said base member and said thermostatic element including spaced surfaces defining sides of an air passageway extending therebetween, and means for inducing a flow of room air into said passageway and along said surface of said thermostatic element comprising a second flow passageway between said switch means and said base member, and openings in said base member at upper and lower sides thereof for directing a flow of air through said second flow passageway.

10. A thermostat of the type defined in claim 9 wherein said base member includes mounting means for connecting said base member to the wall of said room, said mounting means including an eye member having an opening therein and connected to said base member by an arm portion, and a fastener extending through said opening and operable to connect said thermostat to said wall, said arm yieldably flexing in response to a predetermined tension in said fastener to prevent deformation of said base member during installation of said thermostat.

11. A thermostatically operated electric switch mechanism comprising, a base member adapted to be attached to a vertical wall, said base member comprising, a panel-like portion having flange means along opposite sides thereof and extending from one major surface thereof and adapted to space said panel from the wall to which said member is attached, said flange means being open at the top and the bottom of said panel portion for forming a vertical air passageway between said panel portion and the wall to which said base member is attached, electric switch means attached to said one side of said panel portion, said switch means including a switch operating member and case enclosing switch contact means, leg-like members attached at one end to said panel portion and attached to said case at the outer end and supporting said case from said panel whereby said panel and case form opposed sides of said air passage, a platform member supported on said panel portion in spaced relation to the other major surface of said panel portion, leg means attached at one end to said panel portion and attached at the other end to said platform member to space said platform member from said panel and form a vertical air passage between said platform and panel portion, a thermally responsive element attached to said platform and disposed between said platform and said panel, and means interconnecting said thermally responsive element and said switch operating member.

12. A thermostatically operated electric switch mechanism as defined in claim 11 and further including a cover comprising a face plate having rearwardly extending peripheral flange means, and means attaching said cover to said member in spaced parallel relation to said platform, said cover being spaced from the top and bottom of said panel to provide a vertical air passage between said panel and platform.

13. A thermostat for controlling air temperature in a room and comprising a base structure, switch means supported on said base structure and including an operating member movable in opposite directions to switch on and off positions, a sheet-like bimetallic member supported on said base structure and adapted to have an intermediate portion thereof engage said switch operating member and cause movement of said operating member to said positions by lateral movements of said bimetal member, means on said base structure supporting two opposite ends of said bimetal member whereby lateral movement of said bimetal member causes said switch operating member to shift to and from said on and off positions, means for adjustably shifting one end of said bimetal member laterally within a given range of movement for adjustably positioning said bimetal member relative to said switch operating member, and an anticipator heating element for heating said bimetallic member, said heating element being fixedly supported on said base structure and positioned in relatively close spaced relation to the surface of said intermediate portion of said bimetallic member which engages said switch operating member for radiating heat to said portion whereby the distance between said portion of said bimetallic member and said heating element is constant when said bimetal member moves said switch operating member to either of said positions regardless of adjusted positions of said bimetallic member.

References Cited

UNITED STATES PATENTS

| 1,807,410 | 5/1931 | Hubbard | 174—57 |
| 1,875,369 | 9/1932 | Colman | 200—139 |
| 2,041,566 | 5/1936 | Mischler | 200—139 |
| 2,225,080 | 12/1940 | Newman | 200—139 |
| 2,888,537 | 5/1959 | Mears | 200—138 |
| 3,248,501 | 4/1966 | Hire. | |

BERNARD A. GILHEANY, *Primary Examiner.*

R. L. COHRS, *Assistant Examiner.*

U.S. Cl. X.R.

337—100